(12) United States Patent
Fukui

(10) Patent No.: US 8,635,629 B2
(45) Date of Patent: Jan. 21, 2014

(54) STATUS NOTIFICATION SYSTEM, STATUS NOTIFICATION DEVICE, STATUS MONITORING DEVICE, STATUS DETECTOR, METHOD FOR STATUS NOTIFICATION, AND STORAGE MEDIUM INCLUDING STATUS NOTIFICATION PROGRAM

(75) Inventor: Masayuki Fukui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 553 days.

(21) Appl. No.: 12/731,613

(22) Filed: Mar. 25, 2010

(65) Prior Publication Data
US 2010/0251244 A1    Sep. 30, 2010

(30) Foreign Application Priority Data

Mar. 31, 2009   (JP) ................................ 2009-086203

(51) Int. Cl.
G06F 9/00       (2006.01)
G06F 13/00      (2006.01)
G06F 11/00      (2006.01)

(52) U.S. Cl.
USPC ............................................ 719/318; 714/48

(58) Field of Classification Search
None
See application file for complete search history.

(56) References Cited

U.S. PATENT DOCUMENTS 8,001,232 B1 *   8/2011   Saulpaugh et al. ........... 709/224
2003/0167353 A1 * 9/2003  de Bonet et al. .............. 709/318

FOREIGN PATENT DOCUMENTS

JP    2006-246065    9/2006
JP    2006-285507    10/2006
JP    2008-9640      1/2008

OTHER PUBLICATIONS

Japanese Office Action mailed Mar. 19, 2013 for corresponding Japanese Application No. 2009-086203.

* cited by examiner

*Primary Examiner* — Qing Wu
(74) *Attorney, Agent, or Firm* — Staas & Halsey LLP

(57) ABSTRACT

A status notification system and method including acquiring status information of a monitor target, and performing a process in response to the status information representing a status of the monitor target. A process is performed based on first status information, information of a process execution period from a reception of the first status information to a completion of the process is retrieved, and notification pertaining to second status information is controlled based on the retrieved process execution period.

18 Claims, 12 Drawing Sheets

FIG.2

| STATUS INFORMATION ID | NOTIFICATION DESTINATION ID |
|---|---|
| Sensor-A | Service-A |
| Sensor-A | Service-B |
| ⋮ | ⋮ |

FIG.3

| STATUS INFORMATION ID | STATUS INFORMATION NOTIFICATION CONDITION | NOTIFICATION DESTINATION ID |
|---|---|---|
| Sensor-A | $ (Sensor-A) ≧ 30 | Service-A |
| Sensor-A | $ (Sensor-A) ≧ 35 | Service-B |
| ⋮ | | ⋮ |

FIG.4

| STATUS INFORMATION ID | STATUS VALUE |
|---|---|
| Sensor-A | 25 |
| ⋮ | ⋮ |

FIG.5

| NOTIFICATION DESTINATION ID | PROCESS EXECUTION PERIOD OF NOTIFICATION DESTINATION |
|---|---|
| Service-A | 20 SECONDS |
| Service-B | 10 SECONDS |
| ⋮ | ⋮ |

FIG.6

| NOTIFICATION DESTINATION ID | LAST NOTIFICATION TIME AND DATE | NOTIFICATION SUSPENSION FLAG |
|---|---|---|
| Service-A | 2008/10/31 12:01:00 | False |
| Service-B | 2008/10/31 12:01:20 | True |
| ⋮ | ⋮ | ⋮ |

STATUS NOTIFICATION SYSTEM, STATUS NOTIFICATION DEVICE, STATUS MONITORING DEVICE, STATUS DETECTOR, METHOD FOR STATUS NOTIFICATION, AND STORAGE MEDIUM INCLUDING STATUS NOTIFICATION PROGRAM

CROSS-REFERENCE TO RELATED APPLICATIONS

This application is based upon and claims the benefit of priority of the prior Japanese Patent Application No. 2009-086203, filed on Mar. 31, 2009, the entire contents of which are incorporated herein by reference.

BACKGROUND

1. Field

The embodiments relate to a status notification system and method thereof for managing status information, and more particularly to detecting a status of humans or one or more devices with a variety of sensor(s) and notifying of status information representing a detected status.

2. Description of the Related Art

In one service called "status monitoring service," a plurality of pieces of status information are managed and updated. The updated status information, if satisfying a notification condition, is reported if the status information is registered beforehand to trigger notification of the update based on monitoring of the status information. Such a general status notification system for notifying of the status information has been developed.

In the notification registration, a notification condition is specified. The status information is reported as long as a specific condition, such as duration of the status information, time of change in the status, a status change history, elapsed time from a preceding notification time, is satisfied. In accordance with the status notification system having the specified condition, it generally appears to be possible to reduce unnecessary notifications in the status monitoring service. The technique described here is discussed in Japanese Laid-open Patent Publication Nos. 2006-246065 and 2008-009640.

Each of the status notification systems of a related art, however, sets rigidly and statically the notification condition of the status information during a notification registration. When the status information is updated, status information is reported each time the notification condition is satisfied. Unnecessary notifications in the status monitoring service appear to be reduced since notifications are implemented in strict adherence to occurrence of the conditions that are registered beforehand.

SUMMARY

According to an aspect of the invention, a status notification system and method are provided.

In an embodiment, a status notification system includes a status detection device which acquires status information representing a status of a monitor target, and outputs the acquired status information, a status notification device which notifies of the status information output, a status monitoring device which performs a process in response to the status information representing the status of the monitor target and received from the status notification device. The status monitoring device performs a process based on first status information when the first status information is received, and notifies the status notification device of information representing a progress of the process, where the status notification device retrieves a process execution period from a reception of the first status information to a completion of the process based on the information representing the progress of the process, and controls whether to notify the status monitoring device of second status information received from the status detection device based on the retrieved process execution period.

The aspect and advantages of the invention will be realized and attained by means of the elements and combinations particularly pointed out in the claims.

It is to be understood that both the foregoing general description and the following detailed description are exemplary and explanatory and are not restrictive of the invention, as claimed.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 2 illustrates an example of a notification condition management table.

FIG. 3 illustrates another example of a notification condition management table.

FIG. 4 illustrates an example of a status information management table.

FIG. 5 illustrates an example of a process execution period management table.

FIG. 6 illustrates an example of a notification suspension control management table.

DETAILED DESCRIPTION

Figure 1:
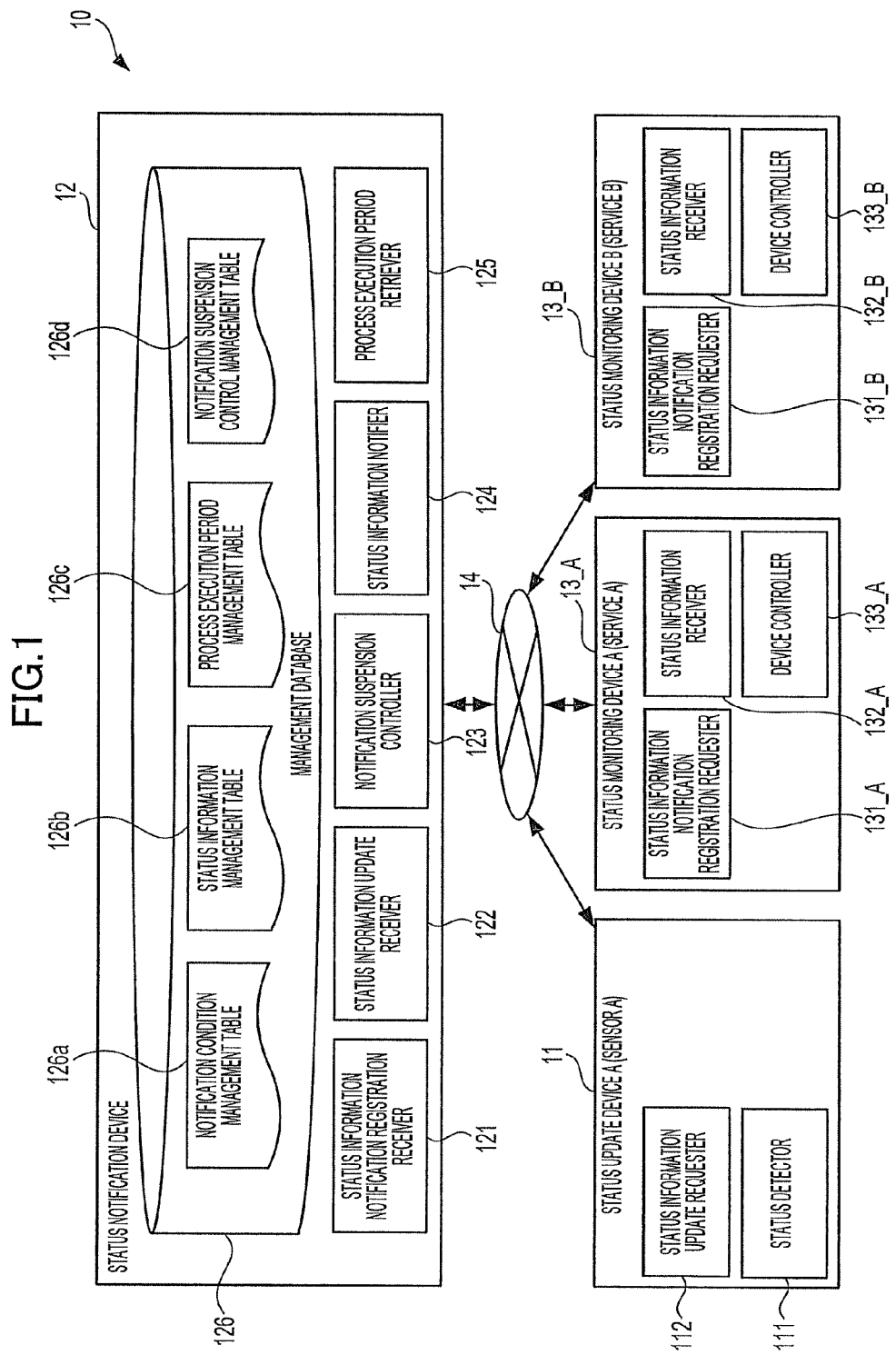
FIG. 1 illustrates a general configuration of a status notification system of an embodiment.

Reference will now be made in detail to the embodiments, examples of which are illustrated in the accompanying drawings, wherein like reference numerals refer to the like elements throughout. The embodiments are described below to explain the present invention by referring to the figures.

Generally, as a sensor device becomes sophisticated with the accuracy thereof increased, updating of status information is expected to be more frequent. During a service execution process of a status monitoring service, the status notification system described above is expected to be notified of more and more new status information satisfying a notification condition that is rigidly and statically set beforehand. In the status notification system of the related art, a notification process can be initiated even if an operation by the status monitoring service is in progress with no further action accepted.

The status notification system may include a plurality of status update devices, each having a sensor and requesting the status information to be updated and provides a plurality of status monitoring services. The status information provided by the status update device is referenced by the plurality of status monitoring services.

However, the typical status notification system has no means that recognizes which status monitoring service monitors the status information updated by own status update device. The typical status notification system has no means that recognizes an optimum timing of each status monitoring service monitoring the status information updated by own status update device. For this reason, the status information is updated rigidly or statically, for example, at regular intervals or at each time of change in the status information. It is thus difficult to optimize an update timing and a notification timing of the status information in a general status notification system.

FIG. 1 illustrates a general configuration of a status notification system 10 of an embodiment.

The status notification system 10 of FIG. 1 includes a status update device 11, a status notification device 12, and two status monitoring devices 13A and 13B.

The status notification device 12 may be a server forming the status notification system 10. The status update device 11, and the status monitoring devices 13A and 13B may be clients connected to the status notification device 12 via a communication line 14 such as the Internet, a local area network (LAN) or the like.

FIG. 1 illustrates a single status update device 11. Optionally, a plurality of status update devices 11 may be employed. The status update device 11 hereinafter may also be referred to as a status update device A or a sensor A.

FIG. 1 illustrates the two status monitoring devices 13A and 13B. Optionally more status monitoring devices may be employed. In a small-scale system, a single status monitoring device may be employed. In the discussion of an embodiment, the status monitoring devices 13A and 13B may also be referred to as the status monitoring devices A and B or services A and B, respectively.

Each of the status update device 11, the status notification device 12, and the status monitoring devices 13A and 13B included in the status notification system 10 of FIG. 1 may include an information processing apparatus, such as a computer, executing a computer program, and a program executed in the information processing apparatus. Functions discussed below in detail include those executed by the information processing apparatus and the program executed by the information processing apparatus. The information processing apparatus and the program thereof form each of the status update device 11, the status notification device 12, and the status monitoring devices 13A and 13B.

The status update device 11 requests status information to be updated if the status information representing a status of a monitor target is retrieved and satisfies an update criteria. The status update device 11 is one example of a status notification device. The status monitoring devices 13A and 13B perform a process in response to a notice of the status information representing a status of a monitor target. The status notification device 12 manages the status information representing the status of the monitor target. In response to an update request of the status information from the status update device 11, the status notification device 12 updates the status information as an update request, and sends to the status monitoring devices 13A and 13B the status information if a notification condition is satisfied. Each of these devices is described in detail below.

The status update device 11 includes a status detector 111 and a status information update requester 112.

The status detector 111 detects a status with a sensor device. The status detector 111 may sense or measure various types of elements or data. For example, in the case of a system that measures a room temperature, a temperature sensor detects a room temperature. If the update criteria are satisfied, the status information update requester 112 sends to the status notification device 12 the status information representing the status detected by the status detector 111 and requests the status information managed by the status notification device 12 to be updated. The update criteria may be typically a change in the status detected by the status detector 111 (for example, a temperature change equal to or greater than 0.5° C. in the case of the temperature sensor). Depending on a system configuration, the update criteria may be a specific elapsed time from a previous update request. For example, the update request may be made every minute regardless of a change in the status. The update criteria may be set depending on the configuration of or the object of the system. In accordance with an embodiment, the update criteria are a change in the status of the monitor target in the status detector 111. More specifically, each time the status detector 111 detects a change in the status of the monitor target, the status information update requester 112 requests the status notification device 12 to update the status information. However, the present invention is not limited to an update for each change detected. For example, the status detector 111 may sense each change but cause the status information update requester 112 to request the update when a particular type of change in an object being monitored occurs.

The two status monitoring devices 13A and 13B identical to each other in configuration respectively include status information notification registration requesters 131A and 131B, status information receivers 132A and 132B, and device controllers 133A and 133B.

In order to receive a notice of the status information from the status notification device 12, the information notification registration requesters 131A and 131B issue a notification registration request to the status notification device 12 by presenting a destination identification (ID) as an ID of the status monitoring device 13A or 13B, and a status information ID identifying the status information needed. Any identifier uniquely identifying the status monitoring device 13A or 13B may be provided for registration.

The status information receivers 132A and 132B receive from the status notification device 12 status information which is represented by the status information ID and which the information notification registration requesters 131A and 131B have requested from the status notification device 12.

The device controllers 133A and 133B perform a service such as a device control in response to the status information received by the status information receivers 132A and 132B. In an air-conditioning system, for example, a temperature adjustment is performed on an air-conditioner. The device controllers 133A and 133B may control any control target device characteristic of a system thereof. The control target devices may include online controlled devices such as online household electrical appliances including online TVs, online air conditioners, and online refrigerators. The device controllers 133A and 133B may control a device that provides information including to humans, for example, displaying a message on a display screen or sounding a warning buzzer.

The status information receivers 132A and 132B receive the status information and the device controllers 133A and 133B complete a service responsive to the received status information. The status information receivers 132A and 132B notify the status notification device 12 that the service has been completed. As is described below in detail, the status notification device 12 measures a period from an occurrence of notification of status information to one of the status monitoring devices 13A and 13B, for example, the status monitoring device 13A, to reception of a report of the service completion. The status notification device 12 recognizes the measured period as a time needed for the status monitoring device 13A to complete the service. Alternatively, one or both the status monitoring devices 13A and 13B may expressly notify the status notification device 12 of a period necessary to complete a service and the status notification device 12 then recognizes the reported time as a process execution period of the status monitoring devices 13A and 13B. In accordance with an embodiment, the status monitoring devices 13A and 13B notify the status notification device 12 of the service completion when the service has been completed. The status notification device 12 recognizes a process execution period by measuring a time period from which the notice of the status information is provided to the reception of the service completion notice.

The status notification device 12 includes a management database 126, a status information notification registration receiver 121, a status information update receiver 122, a notification suspension controller 123, a status information notifier 124, and a process execution period retriever 125.

The management database 126 includes a notification condition management table 126a, a status information management table 126b, a process execution period management table 126c, and a notification suspension control management table 126d.

The variety of tables forming the management database 126 are described.

FIG. 2 illustrates an example the notification condition management table 126a.

The notification condition management table 126a illustrated in FIG. 2 includes a "status information ID" and a "notification destination ID" paired with each other. The notification condition management table 126a illustrated in FIG. 2 is added or updated in response to a notification registration request from the status information notification registration requesters 131A and 131B in the respective status monitoring devices 13A and 13B.

In accordance with an embodiment, information of the sensor A is paired with information of the service A. This means that the sensor A (the status update device 11) notifies the service A (the status monitoring device 13A) of the status information to be updated. Similarly, information of the sensor A is paired with information of the service B. The sensor A (the status update device 11) notifies the service B (the status monitoring device 13B) of the status information to be updated. While the status information in FIG. 2 is described as being paired with a corresponding notification destination, the present invention is not limited thereto. For example, it may be possible that an administrator may also be provided as a destination to the status information as well as a corresponding destination that is a recipient of a service.

FIG. 3 illustrates another example of the notification condition management table 126a.

The notification condition management table 126a illustrated in FIG. 3 includes a "status information notification condition" in addition to the "status information ID" and the "notification destination ID." Referring to FIG. 3, "$(sensor A)≥30" is written at a field "status information notification condition." This means that notification is made if a value of the status information detected by the sensor A is equal to or larger than 30 (for example, 30° C. in the case of the temperature sensor). Similarly, "$(sensor A)≥35" is listed in the table in FIG. 3. More specifically, referring to FIG. 3, the status information obtained at the sensor A is addressed to the service A and the service B identified by the notification destinations. Only if the status information has a value of 30 or larger, the status information is sent to the service A, and also only if the status information has a value of 35 or larger, the status information is sent to the service B.

The notification condition management table 126a has a column of a notification condition of the status information as listed in FIG. 3. When the notification condition written in the column is satisfied, the notification is performed. In such a case, the information notification registration requesters 131A and 131B in the respective status monitoring devices 13A and 13B notify the status notification device 12 of the notification condition for the status information notification in addition to the status information ID and the notification destination ID (of own status monitoring devices 13A and 13B).

The notification condition management table 126a of FIG. 2 is further discussed. A notification condition can be present in the notification condition management table 126a of FIG. 2. Referring to FIG. 2, the notification condition is that the status information identified by the status information ID has been updated. In the case of the status notification system 10 of FIG. 1, the status update device 11 requests the status notification device 12 to update the status information with the update criteria that a change has taken place. The status notification device 12 notifies the status monitoring devices 13A and 13B of the status information with the notification condition that the status information has been updated.

FIG. 4 illustrates an example of a status information management table 126b.

The status information management table 126b forming the management database 126 lists a "status information ID," and a "status value" as a present value of the status information identified by the status information ID. Referring to FIG. 4, the value of the status information detected by the sensor A (the status update device 11) is 25 (for example, 25° C. in the case of the temperature sensor).

FIG. 5 illustrates an example of the process execution period management table 126c.

The process execution period management table 126c forming the management database 126 lists a process execution period of each of the notification destination IDs (the status monitoring devices 13A and 13B). The process execution period lasts from a time from which the notice of the status information is provided to the status monitoring devices 13A and 13B to the reception of the notice of the service completion by the status monitoring devices 13A and 13B having received the status information. Referring to FIG. 5, the process execution periods of the service A (the status monitoring device 13A) and the service B (the status monitoring device 13B) are 20 seconds and 10 seconds, respectively.

FIG. 6 illustrates an example of the notification suspension control management table 126d.

The notification suspension control management table 126*d* forming the management database 126 lists a "notification destination ID," a "last notification time and date" of the notification of the status information to the notification destination, and a "notification suspension flag" with one associated with another. After the last notification time and date on which the status information was sent last, the notification destination is notified of the status information each time the status information is updated. Based on this rule, the notification suspension flag indicates whether to notify of the status information update. Referring to FIG. 6, a notification suspension flag "false" indicates that the service A (the status monitoring device 13A) was notified of the status information, Oct. 10, 2008, 12:01:00 (2008/10/31 12:01:00), and that the status information to be sent has not been updated since. A notification suspension flag "true" indicates that the service B (the status monitoring device 13B) was last notified of the status information, Oct. 31, 2008, 12:01:20 (2008/10/31 12:01:20), that the status information to be sent to the service B was updated, and that the notification of the status information has been suspended since the updating.

Returning to FIG. 1, the configuration of the other elements, other than the management database 126, forming the status notification device 12 are described below.

The status information notification registration receiver 121 receives the status information ID uniquely identifying the status information as a monitor target sent from the information notification registration requesters 131A and 131B in the respective status monitoring devices 13A and 13B and the notification destination ID as the identifier of the status monitoring device 13A or 13B that notifies of the status information. The status information notification registration receiver 121 thus updates the notification condition management table 126*a* (see FIG. 2).

The status information update receiver 122 receives a status information update request from the status information update requester 112 in the status update device 11 and then updates the status information management table 126*b* (see FIG. 4). The status information update receiver 122 corresponds to an example of the status information manager in the technique.

In response to information that the status information update receiver 122 has received an update request of the status information, the notification suspension controller 123 references, for example, a process execution period management table 126*c* and the notification suspension control management table 126*d*. If a state occurs needing to set the "notification suspension flag" to be true in the notification suspension control management table 126*d* (see FIG. 6), the notification suspension controller 123 sets the "notification suspension flag" to be true.

If the suspension is canceled (with the status information updated and the process execution period elapsing, for example), the status information notifier 124 notifies the notification destination (the status monitoring devices 13A and 13B) of the status information. Upon notifying of the status information, the status information notifier 124 rewrites the "last notification time and date" to a present time and day in the management database 126 and sets the notification suspension flag to be false. Furthermore, the status information notifier 124 receives from the notification destination of the status information the notice of the completion of the service responsive to the notified status information. The status information notifier 124 corresponds to an example of the status information notifier in the technique.

The process execution period retriever 125 measures a period from the notification of the status information from the status information notifier 124 to the notification destination to a time of reception of the notice of a service completion, and then registers a process completion period obtained from the measured period with the notification destination associated therewith in the process execution period management table 126*c* (FIG. 5).

The devices in the status notification system 10 of FIG. 1 are described below with reference to flowcharts.

Figure 7:
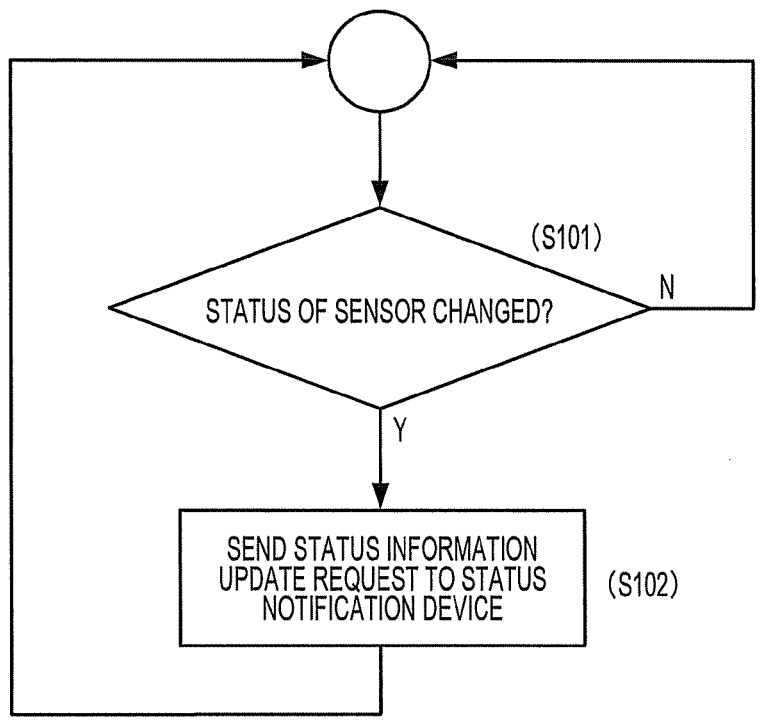
FIG. 7 illustrates processing performed by a status update device.

FIG. 7 illustrates processing performed by the status update device 11.

The status detector 111 (FIG. 1) determines whether a status of a sensor (referred to as a sensor status) has changed, for example, whether the temperature reading on a temperature sensor has changed by one notch (such as 0.5° C.) or more (operation S101). If it is determined that the sensor has changed in the status thereof (yes branch in operation S101), the status information update requester 112 sends the acquired status information to the status notification device 12 (operation S102).

In accordance with an embodiment as previously discussed, the status information managed by the status notification device 12 is requested to be updated each period the update criteria (a change in the status of the sensor) are satisfied.

Figure 8:
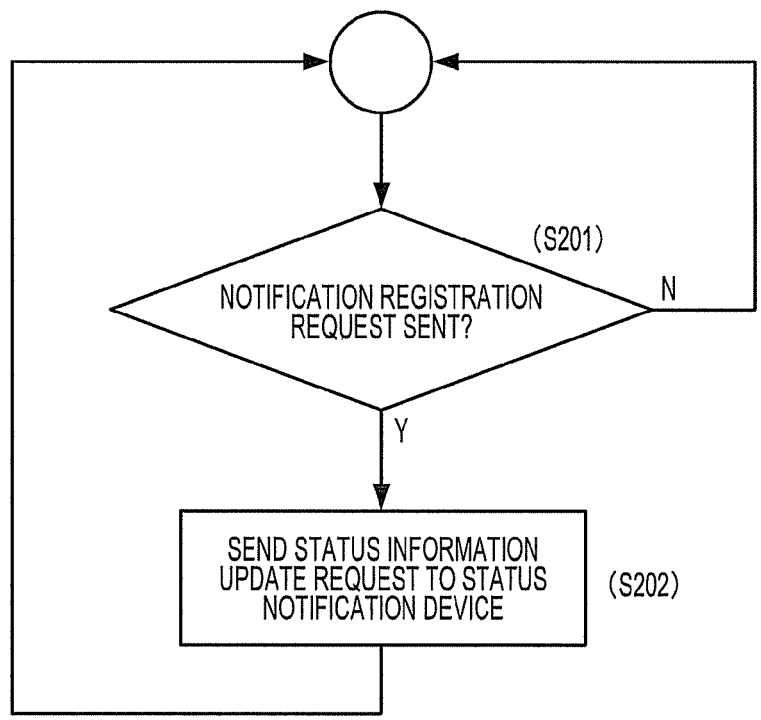
FIG. 8 illustrates a status information notification registration request processing performed by a status monitoring device.

FIG. 8 illustrates a status information notification registration request process performed by, for example, the status monitoring device 13.

The status monitoring device 13 determines whether a status information notification registration request that indicates the status information ID and the notification destination ID as its ID (the status monitoring device 13) has been sent to the status notification device 12 (operation S201). If determined that the status information notification registration request has been sent, a status information update request is sent (operation S202). In response to the update request, the status notification device 12 updates the notification condition management table 126*a* (see FIG. 2).

Figure 9:
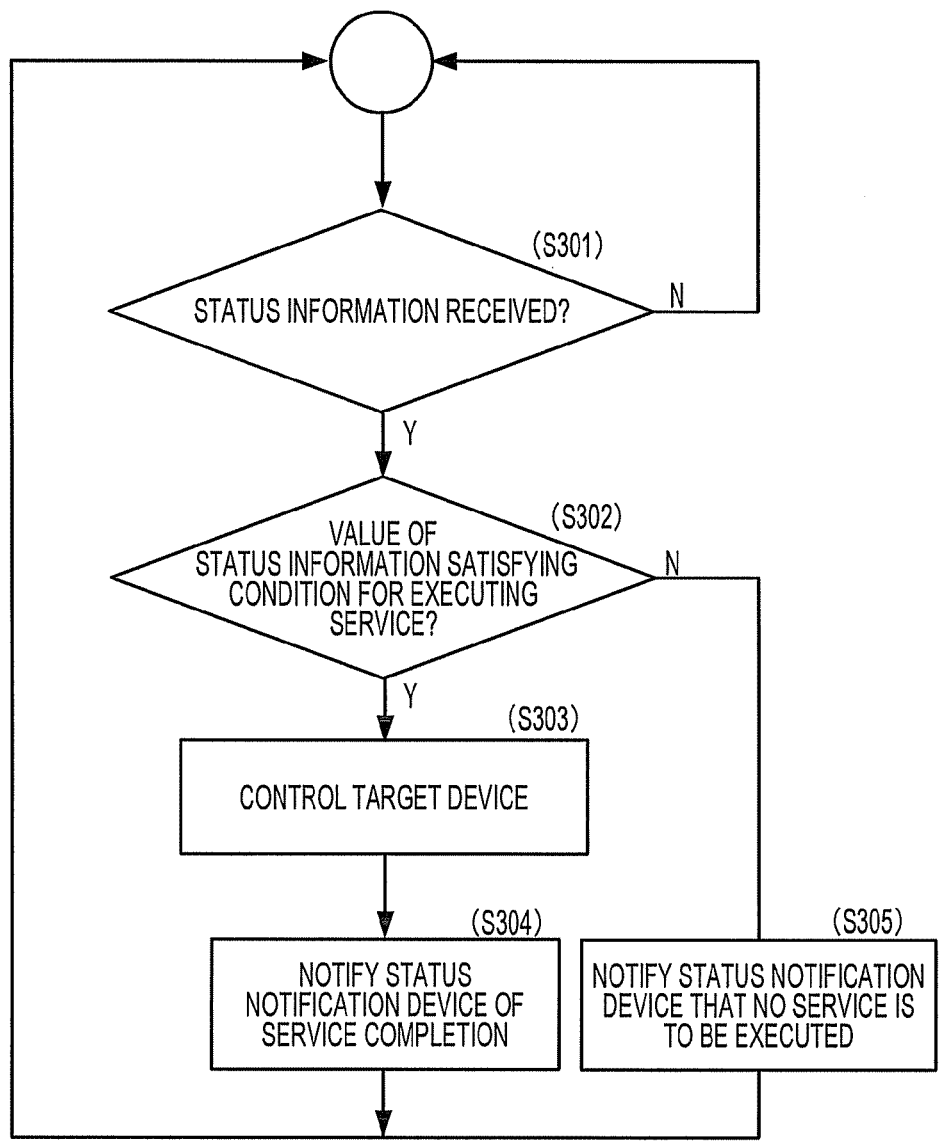
FIG. 9 illustrates a service execution processing performed by a status monitoring device.

FIG. 9 illustrates a service execution process processing performed by the status monitoring device 13.

Upon receiving the status information (S301), the status monitoring device 13 determines whether a value of the received status information satisfies a condition for executing a service (operation S302). If the value of the status information satisfies the condition, the status monitoring device 13 controls a target device (operation S303). The status monitoring device 13 notifies the status notification device 12 of a completion of the control service (operation S304). If the status information fails to satisfy the service execution condition (operation S302), the status monitoring device 13 notifies the status notification device 12 that no service is currently to be performed (operation S305).

Upon receiving the service completion notice, the status monitoring device 13 updates the process execution period management table 126*c* with the period from the notification of the status information to the reception of the notice of the service completion. If the notice that no service is to be performed is received, the process execution period management table 126*c* is not updated.

Figure 10:
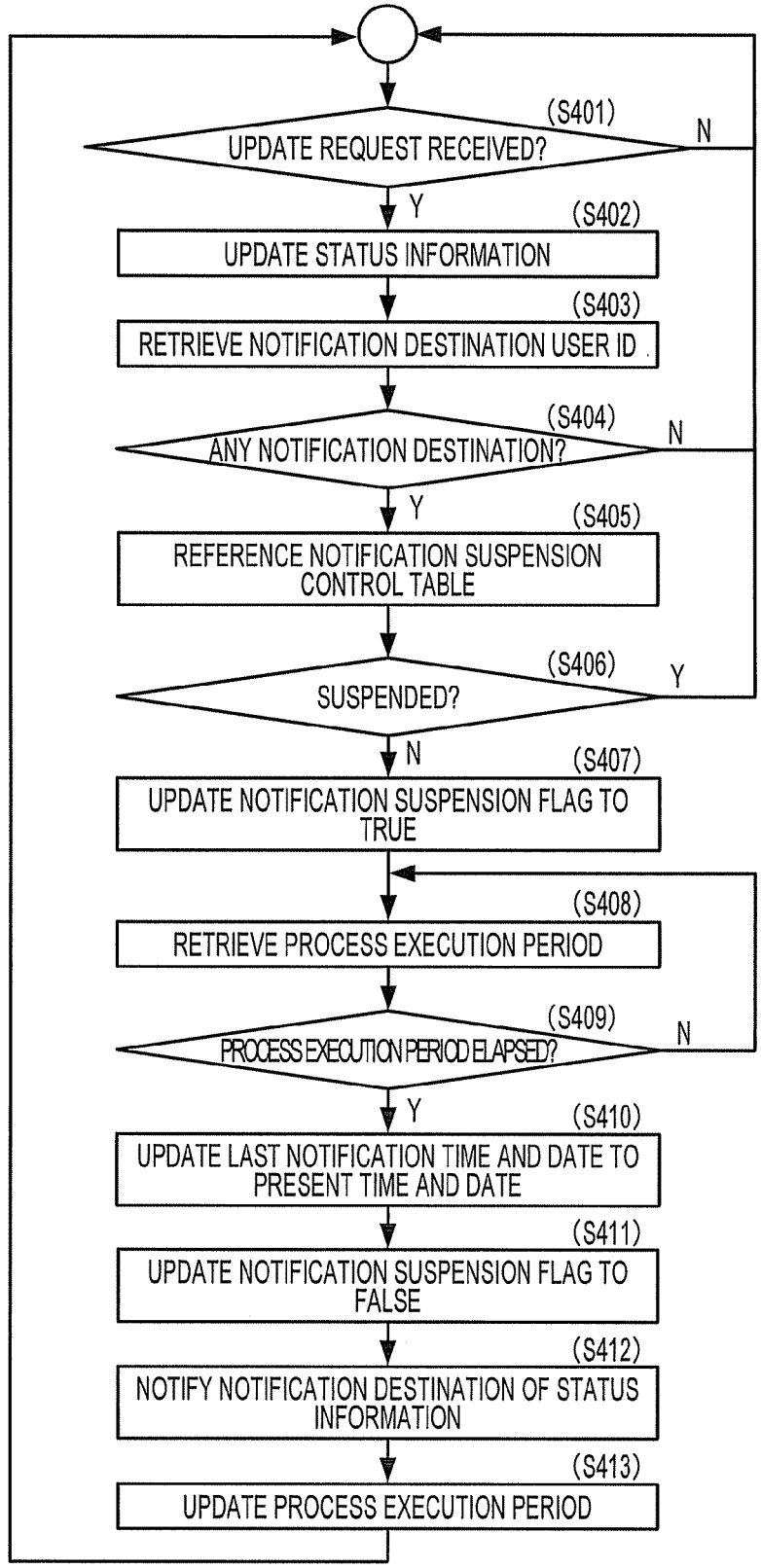
FIG. 10 illustrates processing performed by a status notification device.

FIG. 10 illustrates processing performed by the status notification device 12.

The status notification device 12, for example, determines whether a status information update request has been received from the status update device 11 (operation S401). Upon receiving a status information update request, the status notification device 12 updates the status information in the status information management table 126*b* (operation S402). The status notification device 12 then searches the notification condition management table 126a for the notification destination ID according to which the updated status information is to be addressed (operation S403). While User ID is illustrated in step S403 may be ID of machine. If the notification destination ID according to which the currently updated status information is addressed is present (operation S404), the status notification device 12 can check from the notification suspension control management table 126d whether the notification of the status information to the notification destination ID is suspended or not (operation S405). Referring to FIG. 10, operations S401-S413 are performed serially. If a plurality of notification destinations are present, operations S405-S413 are performed in parallel for the plurality of notification destinations.

If the notification of the status information to the notification destination is not suspended (with the notification suspension flag being false) (operation S406), the notification suspension flag is updated to be true (operation S407). The status notification device 12 references the process execution period management table 126c (FIG. 5), and retrieves the process execution period of the notification destination (operation S408). The status notification device 12 then determines whether the process execution period has elapsed since the time and date recorded as the last notification time and date (see FIG. 6) (operation S409). If the process execution period has not elapsed yet, operations S408 and S409 are repeated. If the process execution period has elapsed, the last notification time and date are updated in the notification suspension control management table 126d (see FIG. 6) (operation S410). The notification suspension flag of the notification destination is updated to be false (operation S411). The status notification device 12 then notifies the notification destination of the status information (operation S412). In response to the service completion notice from the notification destination, the status notification device 12 updates the process execution period in the process execution period management table 126c (see FIG. 5) (operation S413).

If the notification of the status information to the notification destination is indicates as suspended (with the notification suspension flag being true) at operation S406, the processing returns to beginning to determine whether an update request is received at operation S401.

A process sequence performed by the status notification device 12, the status update device 11, and the status monitoring device 13 under the following condition is discussed in detail below.

The notification condition management table 126a lists two different contents as illustrated in FIG. 2. More specifically, in response to updating of the status information by the status update device A, the status monitoring device A (service A) and the status monitoring device B are notified of the status information.

The process execution period management table 126c lists two different contents as illustrated in FIG. 5. More specifically, the process execution period of the status monitoring device A remains constant at 20 seconds. The process execution period of the status monitoring device B decreases from 20 seconds to 15 seconds and then to 10 seconds.

The status of the status update device A (sensor A) is updated every 5 seconds.

Figure 11:
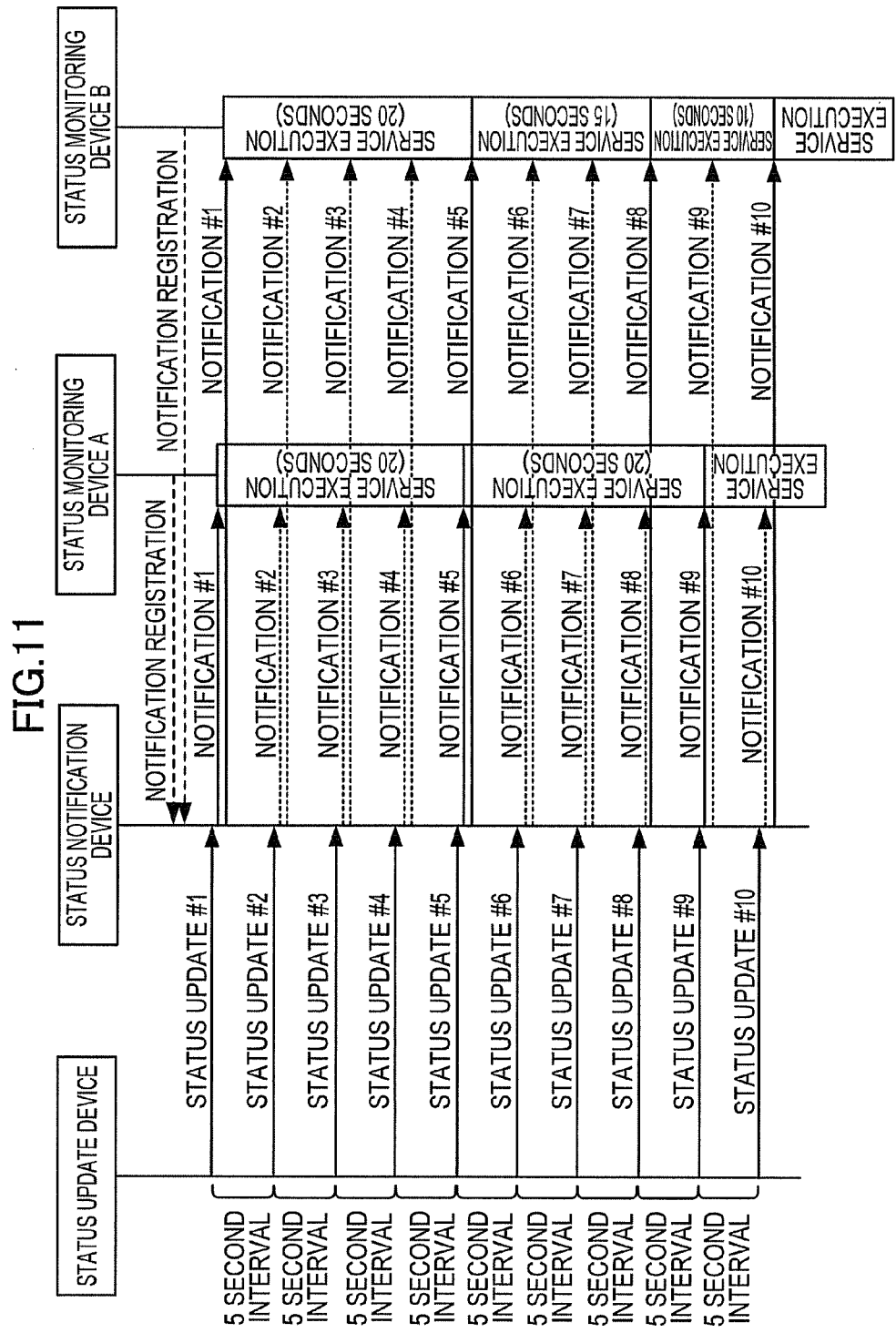
FIG. 11 illustrates a sequence chart of a status notification system of a related art.
Figure 12:
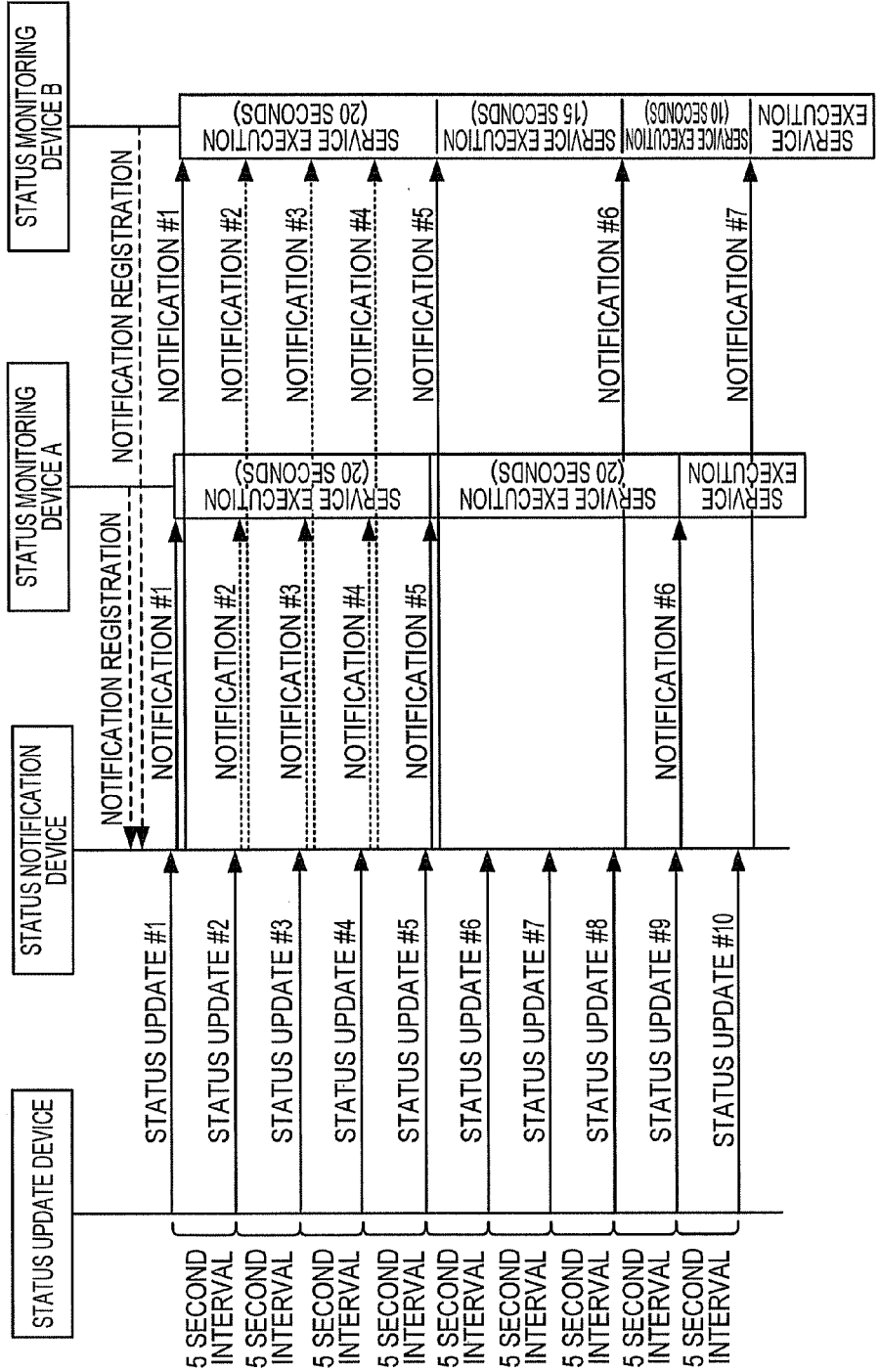
FIG. 12 illustrates a sequence chart of a status notification system of an embodiment.

FIG. 11 illustrates a sequence chart of a status notification system of a related art. FIG. 12 illustrates a sequence chart of the status notification system of an embodiment.

In the status notification system of related art illustrated in FIG. 11, a status notification device receives a status update request from a status update device at time intervals of 5 seconds and at each time, i.e., every 5 seconds, a status monitoring device A and a status monitoring device B are notified of the status information. Services responsive to notifications denoted by solid lines, out of the notifications performed every 5 seconds, are performed by the status monitoring device, but services responsive to notifications denoted by broken lines are disregarded because the status monitoring device is busy with service execution, and thus become useless.

FIG. 12 illustrates the notification processing performed by the status notification system of an embodiment. The notification process of the status notification system remains unchanged until a "status update #5" at which the service execution process period is acquired subsequent to the end of the execution of a first service. Since the notification is suspended thereafter at least until the process execution period has elapsed, the status monitoring device A is notified of the status information once 20 seconds later (with four useless notifications eliminated). The status monitoring device B changes in the process execution period from 20 seconds to 15 seconds to 10 seconds, and is notified of the status information twice (with three useless notifications eliminated).

For convenience of explanation, the update intervals of the status information by the status update device are set to be constant. In practice, however, the update intervals of the status information by the status update device may not constant.

Another embodiment is described below in detail.

Figure 13:
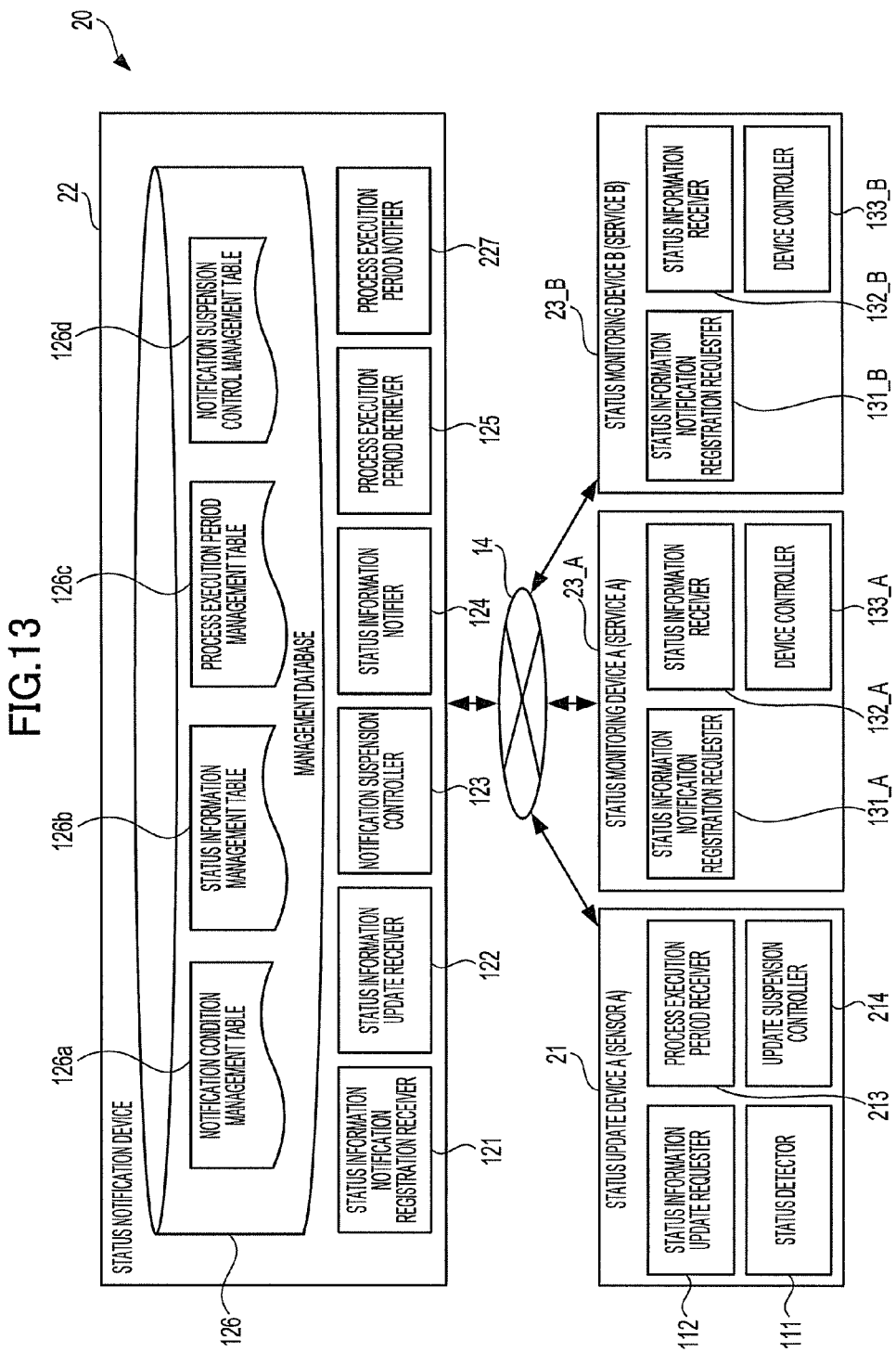
FIG. 13 illustrates a general configuration of a status notification system of an embodiment.

FIG. 13 illustrates a general configuration of a status notification system 20 of an embodiment.

In FIG. 13, elements identical to those illustrated in FIG. 1 are designated with the same reference numerals and only the difference between this embodiment and the above described embodiment is described below.

The status notification system 20 of an embodiment illustrated in FIG. 13 includes a status update device 21, a status notification device 22, and two status monitoring devices 23A and 23B.

The status notification device 22 may be a server forming the status notification system 20. Each of the status monitoring devices 23A and 23 is a client connected to the status notification device 22 via a communication line 14 such as the Internet or a LAN.

As the embodiment described above, another embodiment includes the single status update device 21. Optionally, a plurality of status update devices 21 may be employed. In the an embodiment, the status update device 21 hereinafter may also referred to as a status update device A or a sensor A.

FIG. 13 illustrates the two status monitoring devices 23A and 23B. Optionally more status monitoring devices may be employed. In a small-scale system, a single status monitoring device may be employed. In the discussion of an embodiment, the status monitoring devices 13A and 13B may also referred to as status monitoring devices A and B or services A and B, respectively.

Each of the status update device 21, the status notification device 22, and the status monitoring devices 23A and 23B included in the status notification system 20 of FIG. 13 includes an information processing apparatus, such as a computer, executing a computer program, and the program executed in the information processing apparatus. Functions to be discussed later are those executed by the information processing apparatus and the program executed by the information processing apparatus. The information processing apparatus and the program thereof form each of the status update device 21, the status notification device 22, and the status monitoring devices 23A and 23B.

The embodiment illustrated in FIG. 13 is different from the embodiment illustrated in FIG. 1 in that the status update device 21 has a process execution period receiver 213 and an update suspension controller 214 and that the status notification device 22 has a process execution period notifier 227.

The process execution period notifier 227 in the status notification device 22 notifies the status update device 21 of the process execution period (see FIG. 5) for each notification destination retrieved by the status information notifier 124. The status update device 11 updates the status information for the notification destination. If different process execution periods are retrieved for a plurality of notification destinations (the status monitoring devices 23A and 23B), the notification destinations are notified of a shortest process execution period among the process execution periods.

The process execution period receiver 213 in the status update device 21 receives the process execution period transmitted from the status notification device 22. The status detector 111 may detect a change in the status thereof. The update suspension controller 214 in the status update device 21 prevents the status notification device 22 from being requested to update the status information subsequent to the change if the process execution period has not elapsed since a preceding update request. The update suspension controller 214 thus suspends the update request.

The status information update requester 112 waits on standby until the update suspension controller 214 cancels the update suspension. More specifically, even if a change takes place and an update request of the status information is issued prior to the elapse of the process execution period, the status information update requester 112 waits until the elapse of the process execution period, and then requests the status information to be updated.

The status detector 111 illustrated in FIG. 13 is an example of the status information acquisition unit of the technique. The status information update requester 112 is an example of the status information notifier of the technique. Moreover, the process execution period receiver 213 is an example of the process execution period receiver of the technique.

If a plurality of notification destinations of the status information updated in response to an update request from the status update device 21 are present, the status notification device 22 references the process execution periods of the notification destinations. The status notification device 22 waits until the elapse of each of the process execution periods, and then notifies each notification destination of the status information.

Figure 14:
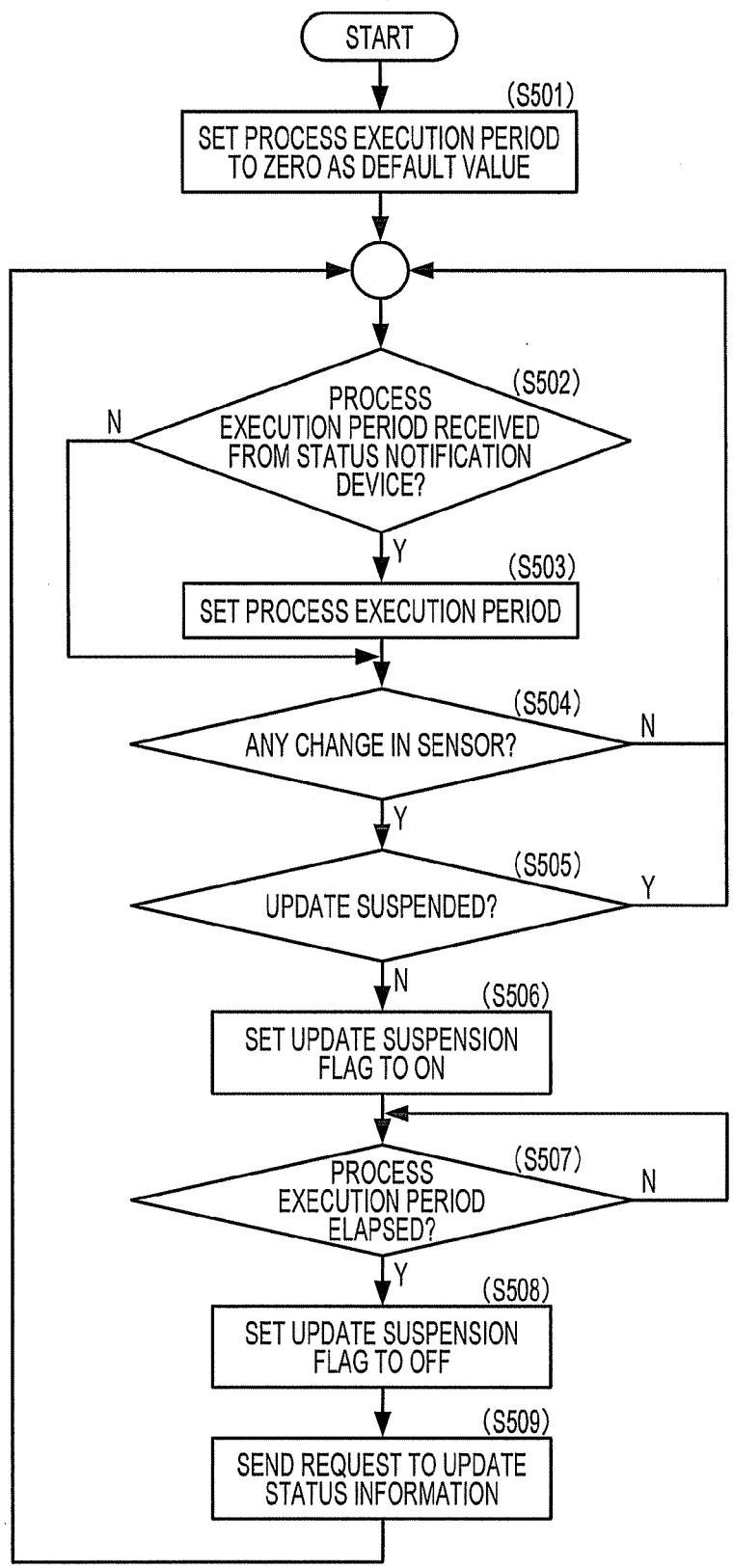
FIG. 14 illustrates processing performed by a status update device of an embodiment.

FIG. 14 illustrates processing performed by the status update device 21 of an embodiment.

The process execution period is set to be zero seconds (operation S501). Upon receiving the process execution period from the status notification device 22 (operation S502), the status update device 21 sets the received process execution period (operation S503). The status update device 21 then determines whether a change has taken place in the sensor (operation S504). If it is determined that a change has taken place in the sensor, the status update device 21 determines whether the notification is suspended (operation S505). If the notification is not suspended, the status update device 21 sets the notification suspension flag (not illustrated) to be on (operation S506). After waiting until the process execution period has elapsed since the last update request time and date (operation S507), the status update device 21 set the notification suspension flag to be off (operation S508). The status update device 21 then requests the status information to be updated (operation S509). If the notification is determined to be suspended at operation S505, the processing returns to determining whether process execution period has been received from the status notification device at operation S502).

Figure 15:
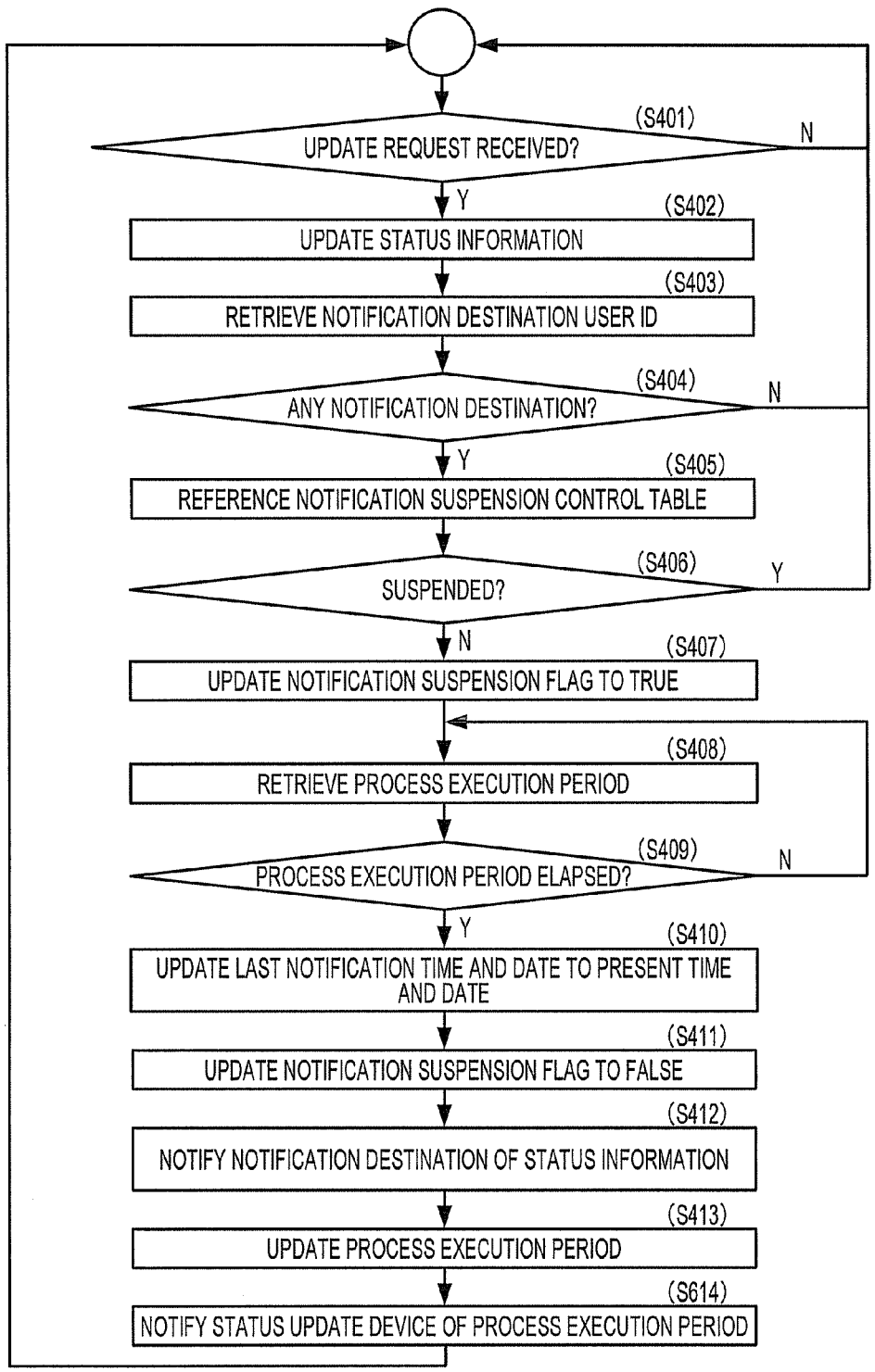
FIG. 15 illustrates processing performed by a status notification device of an embodiment.

FIG. 15 illustrates processing performed by the status notification device 22.

The difference in a process of an embodiment from that of the status notification system illustrated in FIG. 10 lies in operation S614 of FIG. 15. The other operations S401-S413 remain unchanged from the counterparts in the processing of FIG. 10. Only operation S614 is discussed here. If a plurality of notification destinations are present in the discussion of FIG. 10, the process operations in S405-S413 are performed in parallel for all the notification destinations. The same is true of the processing of FIG. 15. However, operation S614 is commonly performed once for all the notification destinations even if the plurality of notification destinations are present.

In operation S614, an update request of the process execution period is issued to the status update device 21. If different process execution periods are set for a plurality of different notification destinations (the status monitoring devices 23A and 23B), the notification destinations are notified of the shortest process execution period of the process execution periods.

Described below is a process sequence performed between the status notification device 22, the status update device 21 and the status monitoring device 23 of this embodiment under the same condition as that of the above-described embodiment.

Figure 16:
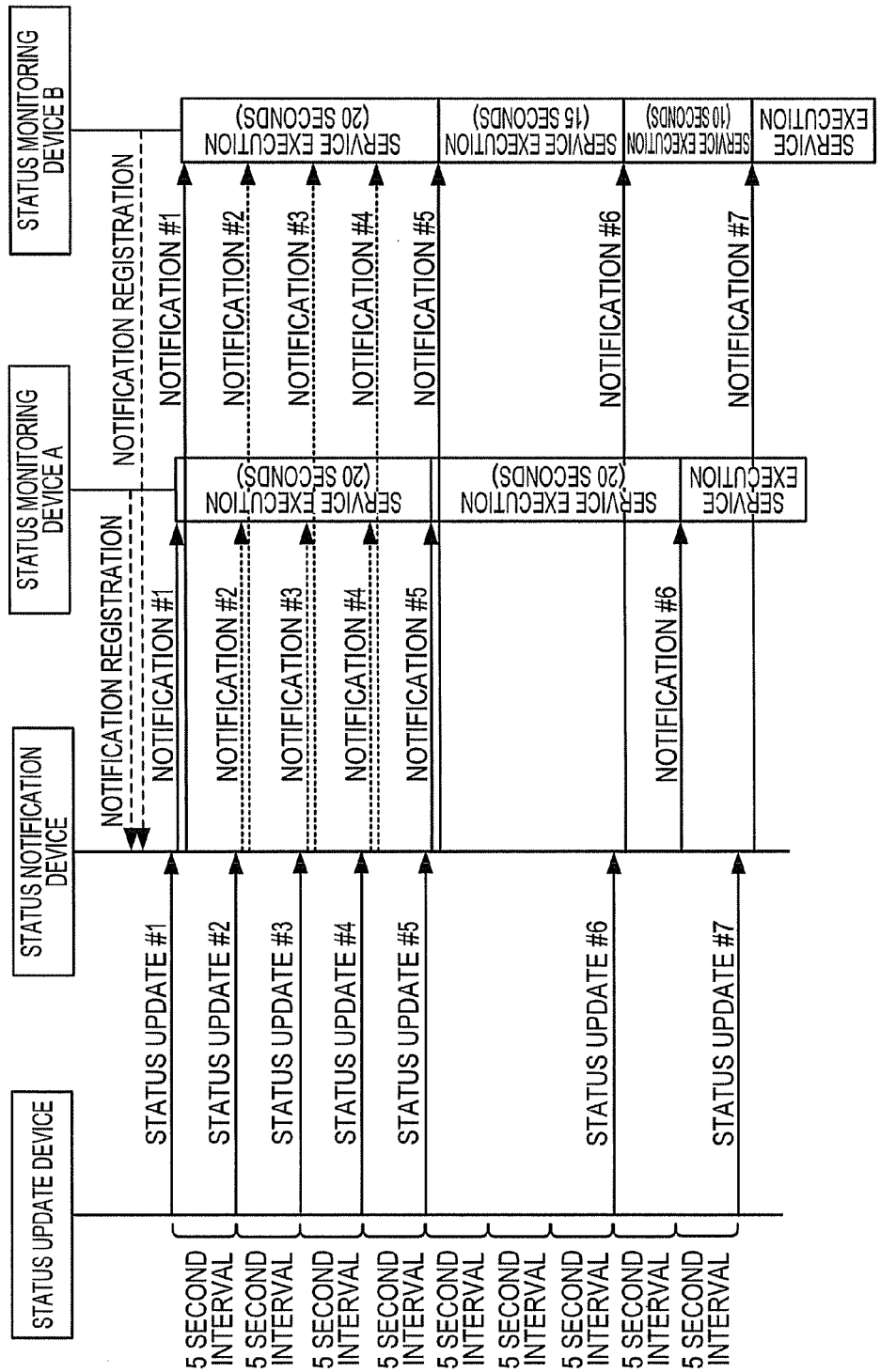
FIG. 16 illustrates a sequence chart of the status notification system of an embodiment.

FIG. 16 illustrates a sequence chart of the status notification system 20 of an embodiment.

In an embodiment, in addition to the advantages of the above-described embodiment (see FIG. 12), the status update device 21 is notified of the process execution period (the shortest process execution period in the case of a plurality of process execution periods) of the status monitoring device 23 so that the status information update is suspended for the process execution period.

As illustrated in FIG. 16, the status update request from the status update device to the status notification device is suspended during the service execution process period of the status monitoring device B and the number of issues of status updates are accordingly reduced. In accordance with an embodiment, the status update request is issued at intervals of 5 seconds by a total of 10 times as illustrated in FIG. 12. In accordance with an embodiment, the issues of the status update request are optimized to seven times in synchronization with a change in the period of the service execution of the status monitoring device B.

For convenience of explanation, the update intervals of the status information by the status update device are set to be constant as illustrated in FIGS. 11 and 12. In practice, however, the update intervals of the status information by the status update device may not be constant.

A system and a computer-implemented method described herein include an operation including controlling a timing of a notification resulting from a detected status of a monitor target based on a progress of execution of a process, and adjusting the timing of the notification in accordance with a current progress of the process. The method includes controlling a notification of a status based on execution of a process using previously provided status information.

In accordance with the technique, the status notification system harmonizes precisely an updating and notification process of the status information at an appropriate timing with a reduction in traffic for the process in the status notification system.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

All examples and conditional language recited herein are intended for pedagogical purposes to aid the reader in understanding the principles of the invention and the concepts contributed by the inventor to furthering the art, and are to be constructed as being without limitation to such specifically recited examples and conditions, nor does the organizations of such examples in the specification relate to a showing of the superiority and inferiority of the invention. Although the embodiments of the present inventions have been described in detail, it should be understood that the various changes, substitutions, and alternations could be made hereto without departing from the spirit and scope of the invention, the scope of which is defined in the claims and their equivalents.

What is claimed is:

1. A status notification system, comprising:
    a status notification device having a processor, the processor executing:
        notifying of status information of a monitor target; and
    a status monitoring device having a processor, the processor executing:
        performing an operation in response to the status information, and
        monitoring a progress of the operation corresponding with an operation execution period, and
    the status notification system including:
        a status update device which acquires the status information representing a status of the monitor target, and outputs the acquired status information, and
    wherein the status monitoring device performs the operation based on first status information when the first status information is received from the status notification device, and notifies the status notification device of information representing a progress of the operation, and
    wherein the operation execution period from a reception of the first status information by the status monitoring device to a completion of the operation by the status monitoring device is indicated based on the information representing the progress of the operation notified from the status monitoring device, and the status notification device controls whether to notify the status monitoring device of second status information received from the status update device based on the operation execution period.

2. The status notification system according to claim 1, wherein the status notification device notifies the status update device of the operation execution period of the status monitoring device, and
    wherein the status update device controls whether to notify the status notification device of the status information acquired by the status update device based on the operation execution period.

3. The status notification system according to claim 1, comprising:
    a plurality of status monitoring devices which perform respective operations in response to the status information representing the status of the monitor target from the status notification device,
    wherein the plurality of status monitoring devices perform the respective operations in response to the first status information received and notify the status notification device of information representing progresses of the respective operations; and
    wherein the status notification device retrieves operation execution periods from the reception of the first status information by each of the plurality of status monitoring devices to the completion of the operation by the status monitoring device based on information representing a progress of an operation from corresponding each of the status monitoring devices, and sets the retrieved operation execution periods of the status monitoring devices as the operation execution periods of the respective status monitoring devices.

4. A status notification system, comprising:
    at least one processor to execute:
        acquiring status information representing a status of a monitor target, and outputs the acquired status information;
        notifying of the status information output;
        performing a process in response to the status information representing the status of the monitor target and received in the notifying, and
    wherein the performing performs the process based on first status information when the first status information is received in the notifying, and notifies a device in the status notification system of information representing a progress of the process, and
    wherein the notifying retrieves a process execution period from a reception of the first status information to a completion of the process by the performing based on the information representing the progress of the process, and controls a timing at which second status information received from a device in the status notification system is transmitted based on the retrieved process execution period.

5. A status notification device which is arranged between a status update device and a status monitoring device to notify the status monitoring device of status information representing a status of a monitor target, the status notification device comprising:
    a processor configured to
        update the status information of a monitor target received from the status update device;
        notify the status monitoring device of first status information received from the status update device, the status update device acquiring the first status information and the status monitoring device receiving the status information representing the status of the monitor target and performing a process based on the received status information;

retrieve a process execution period from a reception of the first status information by the status monitoring device to a completion of the process by the status monitoring device based on information representing a progress of the process received from the status monitoring device; and control whether to notify the status monitoring device of second status information based on the retrieved process execution period.

6. The status notification device according to claim 5, wherein the processor is configured to:

notify the status update device of the process execution period of the status monitoring device retrieved by the process execution period retriever.

7. The status notification device according to claim 5, wherein the processor is configured to:

process execution periods representing a progress of processes received from a plurality of status monitoring devices performing respective processes in response to the first status information representing the status of the monitor target, and sets the retrieved process execution periods of the respective status monitoring devices as process execution periods of the respective status monitoring devices, and controls whether to cause the status information notifier to notify the status monitoring device of second status information based on the process execution period retrieved by the process execution period retriever.

8. A status notification device which is arranged between a status update device and a status monitoring device to notify the status monitoring device of status information representing a status of a monitor target, the status notification device comprising:

a processor configured to update the status information of a monitor target received from the status update device;

notify the status monitoring device of first status information received from the status update device, the status update device acquiring the first status information and the status monitoring device performing a process in response to the status information representing a status of the monitor target received from the status notification device;

retrieve a process execution period from a reception of the first status information by the status monitoring device to a completion of the process by the status monitoring device based on information representing a progress of the process is received from the status monitoring device; and control a transmission timing of second status information to the status monitoring device based on the retrieved process execution period.

9. A status monitoring device which performs an operation based on status information representing a status of a monitor target from a status notification device communicably connected with the status monitoring device, the status monitoring device comprising:

a processor configured to perform the operation responsive to the status information received from the status notification device; and notify the status notification device of information on a completion of the operation when determining that the operation is complete, wherein the information on the completion of the operation is used in the status notification device to calculate an operation execution period that is to be used to cause the status notification device to control whether to notify the status monitoring device of another status information.

10. A status update device which communicates with a status notification device that notifies a status monitoring device of status information, the status update device comprising:

a status information acquisition unit having a processor, the processor executing acquiring the status information representing a status of a monitor target;

a status information notifier having a processor, the processor executing notifying the status notification device of the status information acquired by the status information acquisition unit;

a process execution period receiver having a processor, the processor executing receiving a process execution period from the status notification device; and a notification determiner having a processor, the processor executing determining whether to cause the status information notifier to notify the status notification device of the status information acquired by the status information acquisition unit based on the process execution period received by the process execution period receiver.

11. A computer-readable storage medium storing a status notification program to cause a computer to operate as a status notification device, the status notification program causing the computer to execute an operation, comprising:

updating first status information of a monitor target received as status information representing a status of the monitor target from a status update device communicably connected with the status notification device;

notifying a status monitoring device communicably connected to the status notification device of the received first status information;

retrieving a process execution period from a reception of the status information by the status monitoring device to a completion of a process by the status monitoring device based on the received information representing a progress of the process based on the received first status information is received from the status monitoring device; and controlling whether to cause the status notification device to notify the status monitoring device of second status information, based on the retrieved process execution period.

12. A computer-readable storage medium storing a status notification program to cause a computer to operate as a status notification device, the status notification program causing the computer to execute an operation, comprising:

updating first status information of a monitor target received as status information representing a status of the monitor target from a status update device communicably connected with the status notification device;

notifying a status monitoring device communicably connected with the status notification device of the received first status information;

calculating an operation execution period from a reception of the status information by the status monitoring device to a completion of the operation by the status monitoring device based on the received information representing a progress of the operation received from the status monitoring device; and controlling a transmission timing of the status notification device transmitting second status information to the status monitoring device, based on the calculated operation execution period.

13. A computer-readable storage medium storing a status monitoring program to cause a computer to operate as a status monitoring device, the status monitoring program causing the computer to execute an operation comprising:
- performing an operation in response to a reception of status information representing a status of a monitor target;
- monitoring a progress of the operation corresponding with a an operation execution period;
- executing the operation responsive to the received status information based on a reception of the status information; and
- notifying a status notification device of information on a completion of the operation when determining the operation is complete, wherein the information on the completion of the operation is used in the status notification device to calculate an operation execution period that is to be used to cause the status notification device to control whether to notify the status monitoring device of another status information.

14. A computer-readable storage medium storing a status detection program to cause a computer as a status update device, the status detection program causing the computer to execute an operation, comprising:
- acquiring status information representing a status of a monitor target
- notifying a status notification device communicably connected with the status update device of the acquired status information;
- receiving a process execution period from the status notification device; and
- determining whether to notify the status notification device of the received status information based on the received process execution period.

15. A status notification method performed by a status notification device which is arranged between a status update device and a status monitoring device to notify the status monitoring device of status information representing a status of a monitor target, the status notification method comprising:
- updating first status information of the monitor target received from the status update device;
- notifying the status monitoring device of the first status information received from the status update device, the status update device acquiring the status information and the status monitoring device performing a process in response to the status information representing a status of the monitor target from the status update device;
- retrieving a process execution period from a reception of the first status information by the status monitoring device to a completion of the process by the status monitoring device based on information representing a progress of the process when the information representing the progress of the process is received from the status monitoring device; and
- controlling whether to notify the status monitoring device of second status information based on the retrieved process execution period.

16. A status notification method performed by a status notification device which is arranged between a status update device and a status monitoring device to notify the status monitoring device of status information representing a status of a monitor target, the status notification method comprising:
- updating first status information of the monitor target received from the status device;
- notifying the status monitoring device of the first status information received from the status update device, the status update device acquiring the status information and the status monitoring device performing a process in response to the status information representing the status of the monitor target from the status update device;
- calculating a process execution period from a reception of the first status information by the status monitoring device to a completion of the process by the status monitoring device based on information representing a progress of the process received from the status monitoring device; and
- controlling a timing of transmitting second status information to the status monitoring device based on the calculated process execution period.

17. A status notification method performed by a status monitoring device that performs a process in response to status information representing a status of a monitor target from a status notification device communicably connected with the status monitoring device, the status notification method comprising:
- performing an operation responsive to the status information received from the status notification device;
- monitoring a progress of the operation corresponding with a process execution period; and
- notifying the status notification device of information on a completion of the operation when determining that the operation is complete, wherein the information on the completion of the operation is used in the status notification device to calculate an operation execution period that is to be used to cause the status notification device to control whether to notify the status monitoring device of another status information.

18. A status detection method performed by a status update device that notifies a status notification device of status information, the status notification device notifying a status monitoring device of the status information, the status detection method comprising:
- acquiring the status information representing a status of a monitor target;
- notifying the status notification device of the acquired status information, the status notification device being communicably connected with the status update device;
- receiving a process execution period from the status notification device; and
- determining whether to notify the status notification device of the received status information based on the received process execution period.

* * * * *

UNITED STATES PATENT AND TRADEMARK OFFICE
CERTIFICATE OF CORRECTION

| | |
|---|---|
| PATENT NO. | : 8,635,629 B2 |
| APPLICATION NO. | : 12/731613 |
| DATED | : January 21, 2014 |
| INVENTOR(S) | : Fukui |

It is certified that error appears in the above-identified patent and that said Letters Patent is hereby corrected as shown below:

In the Claims

In Column 17, Line 8, In Claim 13, before "an" delete "a".

Signed and Sealed this
Twenty-ninth Day of April, 2014

Michelle K. Lee
*Deputy Director of the United States Patent and Trademark Office*